United States Patent
Yu

(10) Patent No.: US 10,832,406 B2
(45) Date of Patent: Nov. 10, 2020

(54) QUANTITATIVE PATHOLOGY ANALYSIS AND DIAGNOSIS USING NEURAL NETWORKS

(71) Applicant: Kun-Hsing Yu, Boston, MA (US)

(72) Inventor: Kun-Hsing Yu, Boston, MA (US)

(73) Assignee: PRESIDENT AND FELLOWS OF HARVARD COLLEGE, Cambridge, MA (US)

(*) Notice: Subject to any disclaimer, the term of this patent is extended or adjusted under 35 U.S.C. 154(b) by 138 days.

(21) Appl. No.: 16/179,101

(22) Filed: Nov. 2, 2018

(65) Prior Publication Data

US 2019/0147592 A1    May 16, 2019

Related U.S. Application Data

(60) Provisional application No. 62/586,248, filed on Nov. 15, 2017.

(51) Int. Cl.
| | |
|---|---|
| *G06T 7/00* | (2017.01) |
| *G06K 9/62* | (2006.01) |
| *G06N 3/04* | (2006.01) |
| *G06K 9/00* | (2006.01) |
| *G06K 9/46* | (2006.01) |
| *G06N 3/08* | (2006.01) |

(52) U.S. Cl.
CPC .......... *G06T 7/0012* (2013.01); *G06K 9/0014* (2013.01); *G06K 9/00147* (2013.01); *G06K 9/4628* (2013.01); *G06K 9/6267* (2013.01); *G06K 9/6273* (2013.01); *G06N 3/04* (2013.01); *G06N 3/0454* (2013.01); *G06N 3/08* (2013.01); *G06K 2209/051* (2013.01); *G06T 2207/20084* (2013.01); *G06T 2207/30024* (2013.01); *G06T 2207/30096* (2013.01)

(58) Field of Classification Search
CPC ................. G06T 7/0012; G06T 7/0014; G06T 2207/20084; G06T 2207/20024; G06T 2207/30096; G06K 9/0014; G06K 9/00147; G06K 9/6267; G06K 9/6277
See application file for complete search history.

(56) References Cited

U.S. PATENT DOCUMENTS

| | | | |
|---|---|---|---|
| 2018/0129911 A1* | 5/2018 | Madabhushi et al. | .... G06T 3/40 |
| 2018/0232883 A1* | 8/2018 | Sethi et al. | ............ G16H 50/20 |

* cited by examiner

*Primary Examiner* — Andrew W Johns
(74) *Attorney, Agent, or Firm* — Morgan, Lewis & Bockius LLP

(57) ABSTRACT

Histological images are preprocessed and classified among pathology states using a neural network. In preprocessing, the digital image is electronically partitioned into a grid of identically sized, overlapping subimages, and images are selected for analysis based on a parameter such as density.

30 Claims, 1 Drawing Sheet

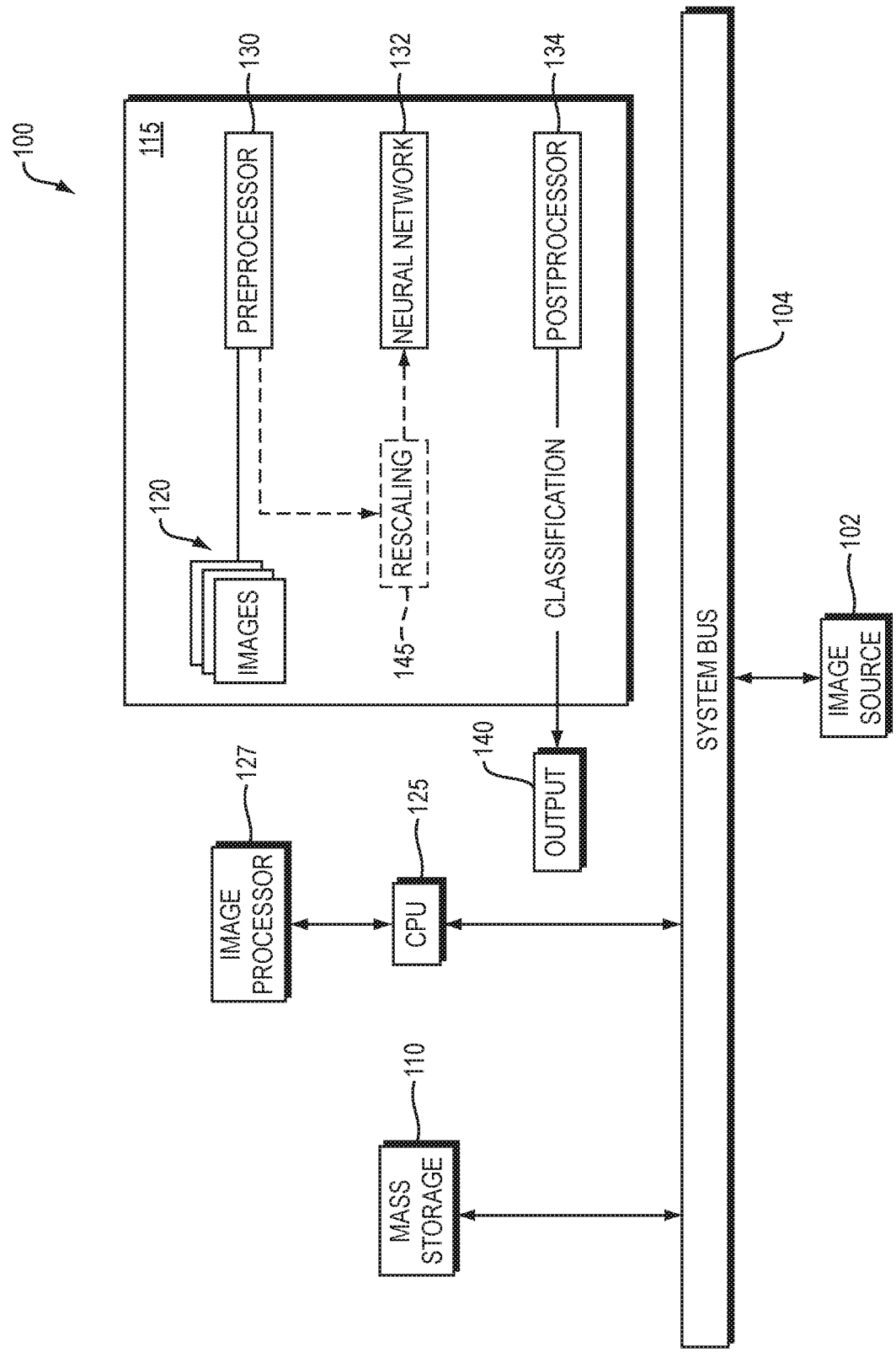

QUANTITATIVE PATHOLOGY ANALYSIS AND DIAGNOSIS USING NEURAL NETWORKS

RELATED APPLICATION

This application claims the benefit of and priority to U.S. Provisional Patent Application No. 62/586,248, filed Nov. 15, 2017, the entire disclosure of which is hereby incorporated by reference.

BACKGROUND

Historically, histopathology and cytopathology have been the main tools used to diagnose cancer. Histopathology is the examination of tissue by trained pathologists to detect malignancy and classify its subtype. Accurate histopathology diagnosis is crucial for formulating optimal treatment plans for cancer patients. The techniques employed have evolved over time, from visual analysis of stained slides to tissue evaluation by immunocytochemistry.

These techniques, however, are far from perfect. Manual evaluation is laborious and subjective. Studies of clinical accuracy have revealed frequent errors in diagnosis, as well as disagreement on diagnosis among trained clinicians. Erroneous diagnosis can lead to suboptimal treatment and loss of quality of life in numerous patients. Accordingly, there is a need for improved histological analysis with greater reliability and reproducibility.

Computer vision algorithms, including neural networks, have exhibited good performance for image classification. Neural networks process information in a manner similar to the human brain. The network is composed of a large number of highly interconnected processing elements (neurons) working in parallel to solve a specific problem. Neural networks learn by example; they are not programmed to perform a specific task. Hence, neural networks can recognize disease states from histological images without the use of specific algorithms to target particular types of disease-specific tissue features; the details of how to recognize disease, in other words, are not needed. What is needed, instead, is a training set of images that collectively represent the variations of the disease (including its absence). The examples are carefully selected so that, once "trained" on them, the system produces an acceptably low rate of false positives and false negatives.

Recent efforts to apply neural networks to histopathology applications have exhibited two key disadvantages. First, whole-slice tissue images contain large amounts of image information, sometimes Gigabytes of data. Even with the fastest computers, applying neural-network techniques to such images can be extremely slow, particularly during the training phase. Second, the conventional neural-network paradigm that rigorously avoids prior feature specification in favor of, in effect, allowing the neural network to implicitly discover the important features during training has not produced reliable results. The wealth of irrelevant information in typical histological images not only slows processing but also limits diagnostic accuracy.

SUMMARY

It has been found that judicious preprocessing and postprocessing of histological images substantially improve performance when the images are analyzed using a neural network. It is also advantageous to utilize a convolutional neural network, in which individual neurons are organized in layers: each neuron receives inputs from the neurons in the previous layer, integrates the inputs with mathematical functions, and generates an output to the neurons in the next layer. Convolutional neural networks can learn data-specific convolution kernels to transform lower-level features, such as individual pixels, to higher-level features, such as edges or geometric shapes. Researchers have utilized this framework to identify objects in images and videos. Convolutional neural networks are particularly difficult to apply in many medical studies since thousands to millions of training cases may be required to achieve satisfactory performance.

Thus, in a first aspect, the invention pertains to a pathology classification system. In various embodiments, the system comprises a processor; a computer memory for storing a digital image of tissue to be analyzed, where the digital image comprises or consists of an m×n array of pixels (m and n are non-zero integers); an image preprocessor, executed by the processor and configured to (i) partition the digital image into a grid of identically sized, overlapping subimages thereof, each of the subimages comprising an o×p array of pixels (o and p are non-zero integers) that includes pixels from a subimage adjacent thereto along a single overlap dimension and $$\frac{o \times p}{m \times n} \leq 0.01,$$

(ii) compute an average pixel density for each of the subimages, and (iii) select q subimages with densities higher than the densities of the other subimages, where q is a non-zero integer equal to or greater than 10; a neural network, executed by the processor and configured to receive the q selected subimages as feature vectors and classify the selected subimages among pathology states; and a postprocessing module, executed by the processor and configured to aggregate the subimage classifications and classify tissue among a plurality of types within the pathology states.

In some embodiments, the pathology states are cancerous vs. benign and the subtypes are types of cancerous tissue. For example, at least a portion of the tissue may be a solid tumor. In some instances, the tissue is lung tissue and the neural network is trained (i) to classify lung adenocarcinoma from adjacent benign tissues, (ii) to differentiate lung squamous cell carcinoma from adjacent benign tissues, (iii) to distinguish lung adenocarcinoma from squamous cell carcinoma, and (iv) further classify the selected subimages as adenocarcinoma, squamous cell carcinoma, or benign.

The subimage classifications may be expressed as probabilities and the postprocessing module may be configured as a probability aggregation framework. The postprocessing module may be configured to classify the tissue within at least one binary outcome class. For example, the binary outcome classes may be one or more of (i) benign vs. malignant or (ii) lung adenocarcinoma vs. lung squamous cell carcinoma.

In some embodiments, each of the subimages comprises at least half the pixels of the adjacent subimage with which it overlaps. The system may include a rescaling module for shrinking each of the selected subimages. The system may also include image augmentation modules, such as those for image rotation, flipping, shifting, shearing, whitening, and brightness adjusting. A network interface may receive the digital image for storage in the memory and transmit the classification of the tissue.

In some embodiments, the neural network is a convolutional neural network. The tissue may be brain tissue, with the pathology states being cancerous vs. benign and the subtypes being types of cancerous brain tissue. The tissue may be ovarian tissue, with the pathology states being cancerous vs. benign and the subtypes being high-grade vs. low-grade cancerous tissue. The tissue may be breast, with the pathology states being cancerous vs. benign and the subtypes being ductal carcinoma vs. lobular carcinoma.

In another aspect, the invention relates to a method of classifying tissue. In various embodiments, the method comprises the steps of electronically storing a digital image of the tissue, the digital image comprising an m×n array of pixels, where m and n are non-zero integers; electronically partitioning the digital image into a grid of identically sized, overlapping subimages thereof, each of the subimages comprising an o×p array of pixels that includes pixels from a subimage adjacent thereto along a single overlap dimension, where o and p are non-zero integers and $$\frac{o \times p}{m \times n} \le 0.01;$$

computing an average pixel density for each of the subimages; selecting q subimages with densities higher than the densities of the other subimages, where q is a non-zero integer equal to or greater than 10; using a neural network to classify the selected subimages among pathology states; and aggregating the subimage classifications and classifying tissue among a plurality of types within the pathology states.

In some embodiments, the pathology states are cancerous vs. benign and the subtypes are types of cancerous tissue. For example, at least a portion of the tissue may be a solid tumor. In some instances, the tissue is lung tissue and (a) the neural network is trained (i) to classify lung adenocarcinoma from adjacent benign tissues, (ii) to differentiate lung squamous cell carcinoma from adjacent benign tissues, and (iii) to distinguish lung adenocarcinoma from squamous cell carcinoma, and (iv) classify the selected subimages as adenocarcinoma, squamous cell carcinoma, or benign; and (b) the postprocessing module is configured to aggregate the subimage classifications and classify the lung tissue as adenocarcinoma, squamous cell carcinoma, or benign.

The tissue may be classified within at least one binary outcome class. For example, the binary outcome classes may be one or more of (i) benign vs. malignant or (ii) lung adenocarcinoma vs. lung squamous cell carcinoma.

In some embodiments, the neural network is a convolutional neural network. The tissue may be brain tissue, with the pathology states being cancerous vs. benign and the subtypes being types of cancerous brain tissue. The tissue may be ovarian tissue, with the pathology states being cancerous vs. benign and the subtypes being high-grade vs. low-grade cancerous tissue. The tissue may be breast, with the pathology states being cancerous vs. benign and the subtypes being ductal carcinoma vs. lobular carcinoma.

In various embodiments, the tissue is colon and the pathology states are cancerous vs. benign; rectal and the pathology states are cancerous vs. benign; stomach and the pathology states are cancerous vs. benign; liver and the pathology states are cancerous vs. benign. The tissue may also be renal, with pathology states of cancerous vs. benign and subtypes of renal clear cell carcinoma, renal papillary cell carcinoma, and renal chromophobe.

As used herein, the term "substantially" means ±10%, and in some embodiments, ±5% of the peak intensity. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWING

In the following description, various embodiments of the present invention are described with reference to the single FIGURE of the drawing, which schematically depicts a representative hardware embodiment in accordance with embodiments of the invention.

DETAILED DESCRIPTION

Refer to FIG. 1, which illustrates, in block-diagram form, a hardware system incorporating a representative embodiment of the invention. The system 100 includes an image source 102 (e.g., an imaging device such as a slide scanner or camera, or a cloud-based source of images), which supplies input histology images to be analyzed. The input images are received over a system bus 104, over which all system components communicate, and may be stored in a mass storage device (such as a hard disk or optical storage unit) 110 as well as in a main system memory 115 (specifically, within a partition defining one or more input image buffers 120 capable of storing one or more histology images or portions thereof). The operation of the illustrated system 100 is directed by a central processing unit ("CPU") 125, and to facilitate rapid execution of the image-processing operations hereinafter described, the system may contain dedicated image-processing hardware 127; this is a standard component well-known to those skilled in the art.

The main memory 115 (which is typically wholly or partly random-access memory) contains a group of modules that control the operation of CPU 125 and its interaction with the other hardware components. An operating system (not shown) directs the execution of low-level, basic system functions such as memory allocation, file management and operation of mass storage device 110. At a higher level, a preprocessing module 130, a neural network module 132, and a postprocessing module 134, each implemented as a series of stored instructions, direct execution of the primary functions performed by the invention, as discussed below. The classification produced by the modules 130, 132, 134 is sent to an output device 140, which may be one or more of a display, a network interface for transmitting the classification, a webserver, etc.

Each of the stored images represents an an m×n array of pixels, where m and n are non-zero integers. Depending on the size of the scanned region, a whole slide image could have 10000×10000 to 90000×30000 pixels. Image preprocessor 130 partitions the image into a grid of identically sized, overlapping subimages (tiles) thereof. Each of the subimage tiles contains an o×p array of pixels that includes pixels from a subimage adjacent thereto along a single overlap dimension, i.e., horizontally or vertically. The quantities o and p are non-zero integers and $$\frac{o \times p}{m \times n} \leq 0.01.$$

For example, from a 10000×10000 pixel image, each subimage tile may be 1000×1000. The denser tiles contain more cells meriting more intensive analysis, so image preprocessor 130 computes an average pixel density for each of the subimages, and selects a set of q subimages with densities higher than the densities of the other subimages; in various embodiments, q is a non-zero integer equal to or greater than 10, i.e., at least 10 subimages are selected. Depending on the tissue and disease being studied, it is possible to select subimages based on a density threshold that is positively associated with pathological changes. In some implementations, each of the subimages includes at least half the pixels of the adjacent subimage with which it overlaps. It can be useful to employ an optional rescaling module 145 to shrink the selected subimages for easier processing so long as classification accuracy remains acceptable.

Optimal values of the variables o, p, and q, and the ratio $$\frac{o \times p}{m \times n},$$

are obtained straightforwardly and without undue experimentation. Experience thus far has demonstrated that so long as the ratio $$\frac{o \times p}{m \times n}$$

is equal to or less than 0.01, wither optimization of values produces little benefit. Nonetheless, values of the variables o, p, and q may be optimized by plotting different values against a cost function or other measure of success.

Neural network 132 receives the selected subimages as feature vectors and classifies the selected subimages as benign or cancerous, i.e., the neural network assigns a classification to each subimage. The neural network has previously been trained on subimages of diseased and healthy tissue, and may be based on any of several conventional platforms. A convolutional neural network, for example, may be implementing using the Caffe platform. AlexNet, GoogLeNet, VGGNet, and the Residual Network (ResNet) may serve as baseline network architectures due to their superior performance. AlexNet has a very efficient network design and employs non-saturating neurons to reduce training time. The design of the GoogLeNet architecture is largely based on the Hebbian principle and has increased depth and width of the network with a budgeted computational cost. VGGNet possesses a deep and homogeneous convolution structure and demonstrates that the depth of a neural network is a crucial performance factor. ResNet is significantly deeper than VGGNet but lowers its model complexity by residual learning.

Postprocessing module 134 aggregates the subimage classifications produced by neural network 132 and classifies cancerous tissue among a plurality of cancer types. For example, the subimage classifications may be expressed as probabilities, and postprocessing module 134 configured as a probability aggregation framework. In some embodiments, the probability aggregation framework involves computing the mean or median of the predicted probability of the subimage classifications and outputting the results as the slide-level prediction. In some embodiments, the probability aggregation framework accounts for the locations of the subimages in determining the weights of the probability for each subimage. Depending on the disease, postprocessing module 134 may be configured to classify the tissue within at least one binary outcome class.

It should be stressed that the distribution of functionality illustrated in FIG. 1 is representative only. The functionality may be spread arbitrarily over multiple intercommunicating devices, or may be centralized in a single device, e.g., a workstation or other computer with sufficient processing capacity. More generally, CPU 125 may be implemented within a general purpose computer, but may utilize any of a wide variety of other technologies including a special-purpose computer, a microcomputer, mini-computer, mainframe computer, programmed microprocessor, microcontroller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), precise timing protocol component (PTP) providing a system with a notion of global time on a network, RFID processor, smart chip, or any other device or arrangement of devices that is capable of implementing the steps of the processes of the invention.

The various modules shown in FIG. 1 may be implemented by computer-executable instructions, such as program modules, and executed by a computer. Generally, program modules include routines, programs, objects, components, data structures, etc. that performs particular tasks or implement particular abstract data types. Any suitable programming language may be used in accordance with the various embodiments of the invention. Illustratively, the programming language used may include assembly language, Accord, Apache Mahout, Basic, C, C++, C*, Caffe, Clojure, Cloudera Oryx, COBOL, ConvNetJS, Cuda, Keras, PyTorch, Theano and TensorFlow, dBase, DeepLearn.js, Forth, FORTRAN, GoLearn, Haskell, H20, Java, Mathematica, MATLAB, Modula-2, Pascal, Prolog, Python, R, REXX, Scala, and/or JavaScript, Scikit-learn, Shogun, Spark MLlib, Weka for example. Further, it is not necessary that a single type of instruction or programming language be utilized in conjunction with the operation of the system and method of the invention. Rather, any number of different programming languages may be utilized as is necessary or desirable.

While system 100 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

The system 100 has been successfully deployed to classify non-small cell lung cancer histopathology images. Non-small cell lung cancer accounts for 85% of lung cancer, with more than 1.4 million newly diagnosed patients per year worldwide. Histopathology analysis by trained pathologists is the "gold standard" for diagnosing non-small cell lung cancer and defines the cancer subtypes. It is crucial to detect lung malignancy, since many treatment modalities (including surgical resection, chemotherapy, radiotherapy, and targeted therapy) can limit the progression of the disease and improve the survival outcomes of the patients. In addition, the distinction between lung adenocarcinoma and squamous cell carcinoma, the two most common subtypes of non-small cell lung cancer, is critical for selecting the optimal treatment: a few clinically actionable genetic variations are almost exclusively observed in adenocarcinoma patients, whereas patients with squamous cell carcinoma respond better to gemcitabine but could suffer from life-threatening hemoptysis when treated with bevacizumab. Therefore, accurate histopathology diagnosis is crucial for formulating optimal treatment plans for lung cancer patients, but the inter-rater agreement of the diagnosis varies among physicians with different levels of expertise.

For analysis of lung tissue, neural network 132 is trained (i) to classify lung adenocarcinoma from adjacent benign tissues, (ii) to differentiate lung squamous cell carcinoma from adjacent benign tissues, and (iii) to distinguish lung adenocarcinoma from squamous cell carcinoma, and (iv) classify the selected subimages as adenocarcinoma, squamous cell carcinoma, or benign. Postprocessing module 134 is configured to aggregate the subimage classifications and classify the lung tissue as adenocarcinoma, squamous cell carcinoma, or benign. Further, postprocessing module 134 is desirably configured to classify the tissue within at least one binary outcome class, e.g., one or more of (i) benign vs. malignant and (ii) lung adenocarcinoma vs. lung squamous cell carcinoma.

In a representative implementation, whole-slide histopathology images of lung adenocarcinoma (n=427) and lung squamous cell carcinoma (n=430) patients in The Cancer Genome Atlas (TCGA) cohort were obtained from the National Cancer Institute Genomics Data Commons. To ensure generalizability, an independent date set from and the International Cancer Genome Consortium cohort (87 lung adenocarcinoma and 37 lung squamous cell carcinoma patients) were also acquired. Patients' clinical profiles, such as age, gender, race, ethnicity, the anatomical subdivision of the neoplasm, as well as the accompanying pathology report, were also obtained. The whole-slide images were broken into tiles with 1000×1000 pixels. Since the denser tiles contain more cells for further analysis, the 200 densest tiles per each whole slide were selected with Open Microscopy Environment tools. The resulting image tiles were rescaled for convolutional neural networks.

To evaluate the performance of the classifier, the TCGA set was divided into distinct training and test sets. The convolutional neural network model was training and all hyper-parameters were finalized through cross-validation on the training set. The finalized model was applied to the test set and the predicted classification for each image was compared to pathologists' label. Receiver operating characteristics (ROC) curves of test set predictions were plotted and the areas under the ROC curves (AUCs) were calculated. The AUCs of different classification tasks were compared. The same procedure was followed for the histopathology images of the ICGC cohort. All statistical analyses were performed in R version 3.3.

In terms of distinguishing the tumor parts of lung squamous cell carcinoma from adjacent benign tissue, results indicated that the convolutional neural network classifier achieved AUC of more than 0.840-0.951 in the TCGA cohort. Similar performance was observed in the validation cohort from ICGC, with AUC more than 0.835-0.883. Visualization of convolution filters revealed that different filters extract distinct cell alignment patterns and emphasized diverse subcellular structures (e.g., cell nucleus and cell nucleoli). These filters may operate synergistically to identify the defining features of lung squamous cell carcinoma.

Adenocarcinoma and squamous cell carcinoma are the two most common subtypes of lung malignancy. It is crucial to distinguish them since the treatment options are different for these two cancer subtypes. A convolutional neural network 132 distinguished lung adenocarcinoma from squamous cell carcinoma with high accuracy. The AUC of the classifiers in the TCGA cohort are approximately 0.821-0.856 and that of the ICGC cohort is 0.760-0.953. Accordingly, the deep-learning framework captured the cell morphologies related to lung cancer diagnosis and identified histopathology slides with tumor cells. The approach requires no human segmentation and feature definition, and the extracted features did not rely on prior pathology knowledge.

The approach described herein may be applied to other pathology classification problems. Brain cancer includes various cancer subtypes, and the prognosis and treatment depend on the type, grade, and mutation status of the tumor. While glioblastoma multiforme (GBM) is associated with poor patient survival (12-15 months median survival time), low-grade glioma (LGG) has a median survival time exceeding 10 years, but the tumor can recur. In a representative implementation, whole-slide histopathology images and pathology reports of patients exhibiting GBM (n=606) and LGG (n=515) in The Cancer Genome Atlas (TCGA) cohort were obtained from the National Cancer Institute Genomics Data Commons. Classifications were obtained as described above using the AlexNet, GoogLeNet and VGGNet frameworks, with AUC 0.955-0.96 in distinguishing GBM from LGG.

A convolutional neural network classifier in accordance herewith distinguished two subtypes of LGG (astrocytoma (n=194) and oligodendroglioma (n=191)) with AUC 0.731-0.809, and distinguished grade 2 LGG (n=249) from grade 3 LGG (n=265) with AUC 0.746-0.806. The mutation status of a malignant brain tumor often focuses on the IDH1 mutation, which is associated with better overall survival than wild-type IDH1. For distinguishing mutated IDH1 in LGG (n=390) from wild-type IDH1 in LGG (n=120) with AUC 0.668-0.724.

The above-described approach was also applied to distinguish ovarian cancer histopathology slides from those of the adjacent normal tissue, with AUC 0.953-0.972. The same approach distinguished high-grade ovarian cancer from low-grade with AUC 0.733-0.831.

A system in accordance with the present invention was also applied to breast cancer patients. Breast cancer is one of the most prevalent cancer types among women, with more than 1.67 million newly diagnosed patients worldwide. The distinction between benign and malignant tissues is crucial for determining the surgical margin for tumor removal. In addition, breast cancer has two major subtypes, invasive ductal carcinoma (n=754) and invasive lobular carcinoma (n=203). Patients with different subtypes may have different molecular profiles and treatment implications. We extended our developed method to breast cancer identification and tumor subtype classification. We showed that the same method can identify images of tumor tissue from benign ones with AUC 0.999 and can classify the two subtypes with AUC 0.956.

The approach described above was also applied to distinguish colon cancer histopathology slides from those of the adjacent normal tissue, with AUC 0.974-0.991; to distinguish rectal cancer histopathology slides from those of the adjacent normal tissue, with AUC 0.982-0.999; to distinguish stomach cancer histopathology slides from those of the adjacent normal tissue, with AUC 0.953-0.971; and to distinguish liver hepatocellular carcinoma histopathology slides from those of the adjacent normal tissue, with AUC 0.950-0.974.

A convolutional neural network classifier in accordance herewith distinguished renal clear cell carcinoma histopathology slides from those of the adjacent normal tissue (AUC 0.986-0.993), renal papillary cell carcinoma histopathology slides from those of the adjacent normal tissue (AUC 0.967-0.982), and renal chromophobe histopathology slides from those of the adjacent normal tissue (AUC 0.989-0.994). The same approach distinguished these three types of renal cancer with AUC 0.937-0.968.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A pathology classification system comprising:
   a processor;
   a computer memory for storing a digital image of tissue to be analyzed, the digital image comprising an m×n array of pixels, where m and n are non-zero integers;
   an image preprocessor, executed by the processor and configured to (i) partition the digital image into a grid of identically sized, overlapping subimages thereof, each of the subimages comprising an o×p array of pixels that includes pixels from a subimage adjacent thereto along a single overlap dimension, where o and p are non-zero integers and $$\frac{o \times p}{m \times n} \leq 0.01,$$

(ii) compute an average pixel density for each of the subimages, and (iii) select q subimages with densities higher than the densities of the other subimages, where q is a non-zero integer equal to or greater than 10;
   a neural network, executed by the processor and configured to receive the q selected subimages as feature vectors and classify the selected subimages among pathology states; and
   a postprocessing module, executed by the processor and configured to aggregate the subimage classifications and classify tissue among a plurality of types within the pathology states.

2. The system of claim 1, wherein the pathology states are cancerous vs. benign and the types are types of cancerous tissue.

3. The system of claim 2, wherein the tissue is lung tissue and
   (a) the neural network is trained (i) to classify lung adenocarcinoma from adjacent benign tissues, (ii) to differentiate lung squamous cell carcinoma from adjacent benign tissues, and (iii) to distinguish lung adenocarcinoma from squamous cell carcinoma, and (iv) classify the selected subimages as adenocarcinoma, squamous cell carcinoma, or benign; and
   (b) the postprocessing module is configured to aggregate the subimage classifications and classify the lung tissue as adenocarcinoma, squamous cell carcinoma, or benign.

4. The system of claim 1, wherein at least a portion of the tissue is a solid tumor.

5. The system of claim 1, wherein the subimage classifications are expressed as probabilities, the postprocessing module being configured as a probability aggregation framework.

6. The system of claim 5, wherein the postprocessing module is configured to classify the tissue within at least one binary outcome class.

7. The system of claim 6, wherein the at least one binary outcome class is one or more of (i) benign vs. malignant or (ii) lung adenocarcinoma vs. lung squamous cell carcinoma.

8. The system of claim 1, wherein each of the subimages comprises at least half the pixels of the adjacent subimage with which it overlaps.

9. The system of claim 1, further comprising a rescaling module for shrinking each of the selected subimages.

10. The system of claim 1, further comprising a network interface configured to receive the digital image for storage in the memory and transmit the classification of the tissue.

11. The system of claim 1, wherein the neural network is a convolutional neural network.

12. The system of claim 1, wherein the tissue is brain tissue, the pathology states are cancerous vs. benign and the types are types of cancerous brain tissue.

13. The system of claim 1, wherein the tissue is ovarian tissue, the pathology states are cancerous vs. benign and the types are high-grade vs. low-grade cancerous tissue.

14. The system of claim 1, wherein the tissue is breast, the pathology states are cancerous vs. benign and the types are ductal carcinoma vs. lobular carcinoma.

15. A method of classifying tissue, the method comprising the steps of:
   electronically storing a digital image of the tissue, the digital image comprising an m×n array of pixels, where m and n are non-zero integers;
   electronically partitioning the digital image into a grid of identically sized, overlapping subimages thereof, each of the subimages comprising an o×p array of pixels that includes pixels from a subimage adjacent thereto along a single overlap dimension, where o and p are non-zero integers and $$\frac{o \times p}{m \times n} \leq 0.01;$$

computing an average pixel density for each of the subimages;
   selecting q subimages with densities higher than the densities of the other subimages, where q is a non-zero integer equal to or greater than 10;

using a neural network to classify the selected subimages among pathology states; and aggregating the subimage classifications and classifying tissue among a plurality of types within the pathology states.

16. The method of claim 15, wherein the pathology states are cancerous vs. benign and the types are types of cancerous tissue.

17. The method of claim 16, wherein the tissue is lung tissue and
    (a) the neural network is trained (i) to classify lung adenocarcinoma from adjacent benign tissues, (ii) to differentiate lung squamous cell carcinoma from adjacent benign tissues, and (iii) to distinguish lung adenocarcinoma from squamous cell carcinoma, and (iv) classify the selected subimages as adenocarcinoma, squamous cell carcinoma, or benign; and
    (b) the subimage classifications classify the lung tissue as adenocarcinoma, squamous cell carcinoma, or benign.

18. The method of claim 15, wherein at least a portion of the tissue is a solid tumor.

19. The method of claim 15, wherein the tissue is classified within at least one binary outcome class.

20. The method of claim 19, wherein the at least one binary outcome class is one or more of (i) benign vs. malignant or (ii) lung adenocarcinoma vs. lung squamous cell carcinoma.

21. The method of claim 15, wherein each of the subimages comprises at least half the pixels of the adjacent subimage with which it overlaps.

22. The method of claim 15, wherein the neural network is a convolutional neural network.

23. The method of claim 15, wherein the tissue is brain tissue, the pathology states are cancerous vs. benign and the types are types of cancerous brain tissue.

24. The method of claim 15, wherein the tissue is ovarian tissue, the pathology states are cancerous vs. benign and the types are high-grade vs. low-grade cancerous tissue.

25. The method of claim 15, wherein the tissue is breast, the pathology states are cancerous vs. benign and the types are ductal carcinoma vs. lobular carcinoma.

26. The method of claim 15, wherein the tissue is colon and the pathology states are cancerous vs. benign.

27. The method of claim 15, wherein the tissue is rectal and the pathology states are cancerous vs. benign.

28. The method of claim 15, wherein the tissue is stomach and the pathology states are cancerous vs. benign.

29. The method of claim 15, wherein the tissue is liver and the pathology states are cancerous vs. benign.

30. The method of claim 15, wherein the tissue is renal, the pathology states are cancerous vs. benign and the types are renal clear cell carcinoma, renal papillary cell carcinoma, and renal chromophobe.

* * * * *